(12) United States Patent
Grossklaus

(10) Patent No.: US 6,773,045 B2
(45) Date of Patent: Aug. 10, 2004

(54) BUMPER FOR MOTOR VEHICLE

(75) Inventor: Thomas Grossklaus, Bötzingen (DE)

(73) Assignee: Peguform GmbH & Co. KG, Botzingen (DE)

(*) Notice: Subject to any disclaimer, the term of this patent is extended or adjusted under 35 U.S.C. 154(b) by 25 days.

(21) Appl. No.: 10/313,179

(22) Filed: Dec. 6, 2002

(65) Prior Publication Data
US 2003/0082310 A1 May 1, 2003

Related U.S. Application Data

(63) Continuation of application No. 09/569,436, filed on May 12, 2000, now abandoned.

(51) Int. Cl.$^7$ ............................................... B60R 19/03
(52) U.S. Cl. ........................ 293/120; 293/142; 293/155
(58) Field of Search ............................... 427/120, 142, 427/155

(56) References Cited

U.S. PATENT DOCUMENTS 3,585,704 A   6/1971   Schroeder
3,829,231 A   8/1974   Hamilton
3,920,111 A   11/1975  Endo et al.
4,548,838 A   10/1985  Sunohara
5,901,976 A   5/1999   Kreuzer et al.

FOREIGN PATENT DOCUMENTS

DE   44 34 210 A1   3/1996
JP   63-175666 B1   7/1968

Primary Examiner—Bernard Pianalto
(74) Attorney, Agent, or Firm—Baker & Daniels

(57) ABSTRACT

In a bumper and/or a bumper protective strip which are arranged tightly together in a finished position, holding apparatus are provided, with which the bumper protective strip is detachably fastenable to provide a spacing from the bumper with respect to the finished spacing. In a method for the painting of the combination of a bumper and with a bumper protective strip, the bumper and the bumper protective strip are before painting, secured together in a spaced relationship and are painted together. Thus, it is possible to paint bumper with bumper protective strips economically with exactly the same color hue and to transport them joined with one another.

19 Claims, 15 Drawing Sheets

BUMPER FOR MOTOR VEHICLE

CROSS-REFERENCE TO RELATED APPLICATIONS

Figure 1:
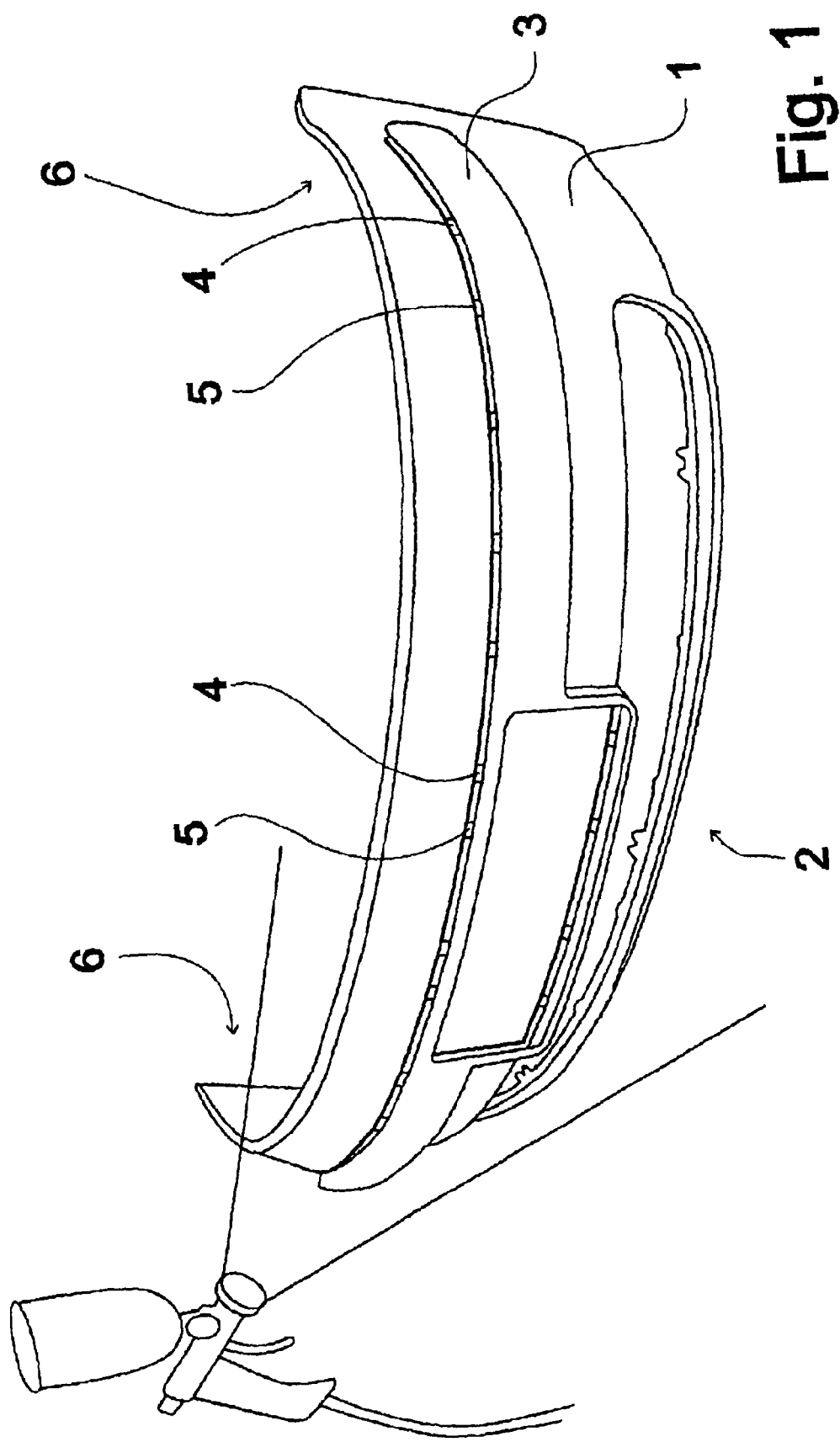

This application is a continuation application from Ser. No. 09/569,436, filed May 12, 2000, now abandoned.

FIELD OF THE INVENTION

The invention relates to a bumper for motor vehicles with a connection to a bumper protective strip and the combination of the bumper and bumper protective strip, in which the bumper protective strip is tightly secured to the bumper in a final assembly. The invention relates further to a process for the painting of a bumper and a bumper protective strip, in which the bumper and the bumper protective strip are painted with the same color.

BACKGROUND OF THE INVENTION

Conventional bumper, bumper protective strips, combinations of the two, as well as processes for the painting of the combination are generally designed so that, because the connector used for the joining of the bumper and the bumper protective strip does not permit the nondestructive separation of the bumper and the bumper protective strip after painting, the bumper and bumper protective strips are generally painted in separate operations. As a result, besides the necessity of painting lines having different supports for each of the bumper and the bumper protective strip, it is relatively expensive and difficult to assure the same color for both the bumper and bumper protective strip pair that are to be joined in the final assembly of a motor vehicle.

Underlying the invention is the problem of giving the bumper, the bumper protective strip, and the combination of the bumper and the bumper protective strip, as well as a process for the painting of the combination thereof, the painting of the bumper and the bumper protective strip with exactly the same color at a low cost.

SUMMARY OF THE INVENTION

This problem is solved according to the subject invention in a bumper of the type mentioned at the outset, wherein the bumper is equipped with a plurality of holding or spacing members, so that the bumper protective strip can be detachably fastened in a spaced manner to the bumper.

This problem is solved according to the invention, in a combination with a bumper and a bumper protective strip and the combination thereof, wherein the bumper and the bumper protective strip are detachably fastened to the bumper by a plurality of holding members at an initially greater spacing than when finally and permanently attached.

This problem is solved according to the invention in the combination of a bumper and with a bumper protective strip of the type mentioned at the outset, by the means that the bumper and the bumper protective strip have a holding device, with which the bumper protective strip may be detachably fastened in a spaced manner to the bumper at a greater distance from the bumper with respect to the final position of the bumper protection strip.

This problem is solved according to the invention in a process for the painting of a bumper and with a bumper protective strip combination by a procedure in which the bumper and the bumper protective strip are painted as a unit, with one spaced from the other by a spacing member so that the bumper as well as the bumper protective strip are painted together. After painting, the spacing member is removed and the respective parts are joined together to form the finished product.

With the bumper, the bumper protective strip, the combination of a bumper and with a bumper protective strip, as well as the process for painting the combination of the bumper and the bumper protective strip according to the invention, the painting of the bumper and of the bumper protective strip positioned in a spaced relationship makes a single painting operation possible, in which, for one thing, by reason of the identical color composition as well as of the environmental conditions of the painting process common, the bumper and the allocated bumper protective strip will have exactly the same color and, further, by shielding bumper areas which do not need to be painted, paint can be saved to a not-inappreciable degree.

Further, because of the positionability of the bumper protective strip spaced from the bumper there is the advantage that the mounting of accessory parts, such as ornamental strips, to be placed between the bumper protective strip and the bumper is simplified.

With the bumper according to the invention it is expedient that the arresting means have safety means connected with the bumper, such as, for example tongue-type or lash-type parts cooperating with a bumper protective strip, in which system the safety means have at their disposable safety parts detachably connectable with the bumper and/or a bumper protective strip.

With the bumper protective strip according to the invention it is expedient that the holding member have safety member connected with the bumper protective strip, such as, for example, tongue-type or lash-type parts cooperating with a bumper, in which system the safety members have safety parts detachably connectable with the bumper protective strip and/or a bumper.

In the combination of the subject invention, the holding member has first safety members connected with the bumper, in which the first safety members have safety parts detachably connectable with the bumper and/or the bumper protective strip. Additionally or alternatively with the combination of the subject invention the holding members have a second safety members connected with the bumper protective strip, in which case the second safety members have second safety parts detachably connectable with the bumper protective strip and/or the bumper.

In the above embodiment of the combination of the subject invention with the first safety members and with the second safety members, the first safety parts, and the second safety parts are preferably identical.

In the last mentioned embodiment of the bumper, the bumper protective strip or of the combination of the bumper and the bumper protective strip, the safety members, in a manner advantageous in manufacturing technology, stand advantageously, for example as spray-on parts directly in connection with the bumper or with the bumper protective means, and a safety place for connection to a hand grip for the reciprocal fastening of the bumper and the bumper protective strip in spaced relationship.

In a further embodiment of the subject invention it is provided that for the formation of the connecting means, the bumper has a number of penetration recesses for the insertion of stop tongues with stop lugs formed on the bumper protective strip in which system the first safety member have in the zone of the penetration recesses tongues formed on the side away from the bumper protective strip; further the first safety parts may be connected with the tongues in such manner that the penetration recesses are secured against the full insertion of the rest lugs.

Furthermore, the second safety member may have at their disposal security tongues formed as an extension of the stop tongues, which second safety parts may be connected with the safety tongues on emergence from the penetration recesses.

With these further developments there is a particularly simple releasable connection of the bumper and bumper protective strips spaced, yet securely connected to the bumper and the bumper protective strip.

In the interest of a stable yet releasable connection of the bumper and the bumper protective strip in each embodiment of the subject invention, the safety parts may be connected both with the tongues and also with the safety tongues.

In a preferred form of the safety member, the safety parts may be formed as H-shaped safety clamps with two grip shanks, two clamp shanks with end side clamp lugs, and a connecting bridge. Further, the safety clamps, the tongues and the security tongues may be constructed so that the tongues or the safety tongues can be gripped by the clamp lugs. For an especially dependable grip of the safety clamps on the bumper protective strip security recesses are formed on the safety tongues into which the clamp shanks can be inserted.

In order to prevent the inadvertent locking of stop tongues of the security means, the security clamps can be constructed so that when the safety clamps are placed on the tongues, the connecting bridges can prevent the rest tongues from penetrating through to the recesses. To prevent the safety clamps from slipping out of the tongues, the tongues have a stop lug on their ends facing away from the bumper.

If a further transport of the painted combination of the subject invention is required with the process of the subject invention, the bumper and the bumper protective strip may be secured in position on the bumper and/or the bumper protective strip in their adjacent arrangement with the spacing between these elements. For the achievement of particularly good painting results, that the spacing between the bumper and the bumper protective strip should be in the range from about 1 millimeter to about 20 millimeters.

Further suitable embodiments of the invention are the object of subclaims as well as of the following specification of an example of execution with reference to the figures of the drawing. In the drawing:

FIG. 1 shows in a perspective representation from the front side of same, a bumper with a bumper protective strip arranged spaced relation.

Figure 2:
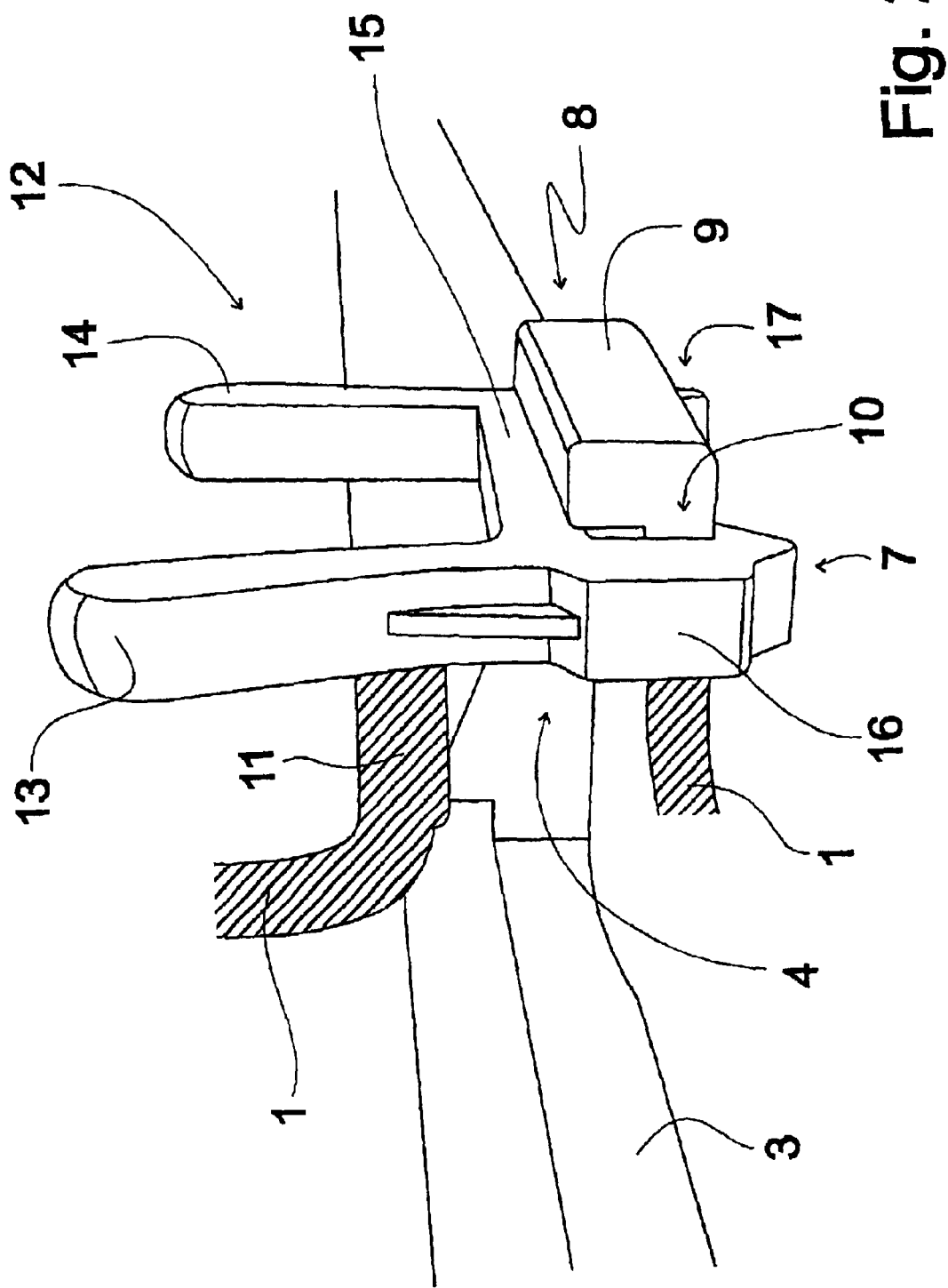
Figure 3:
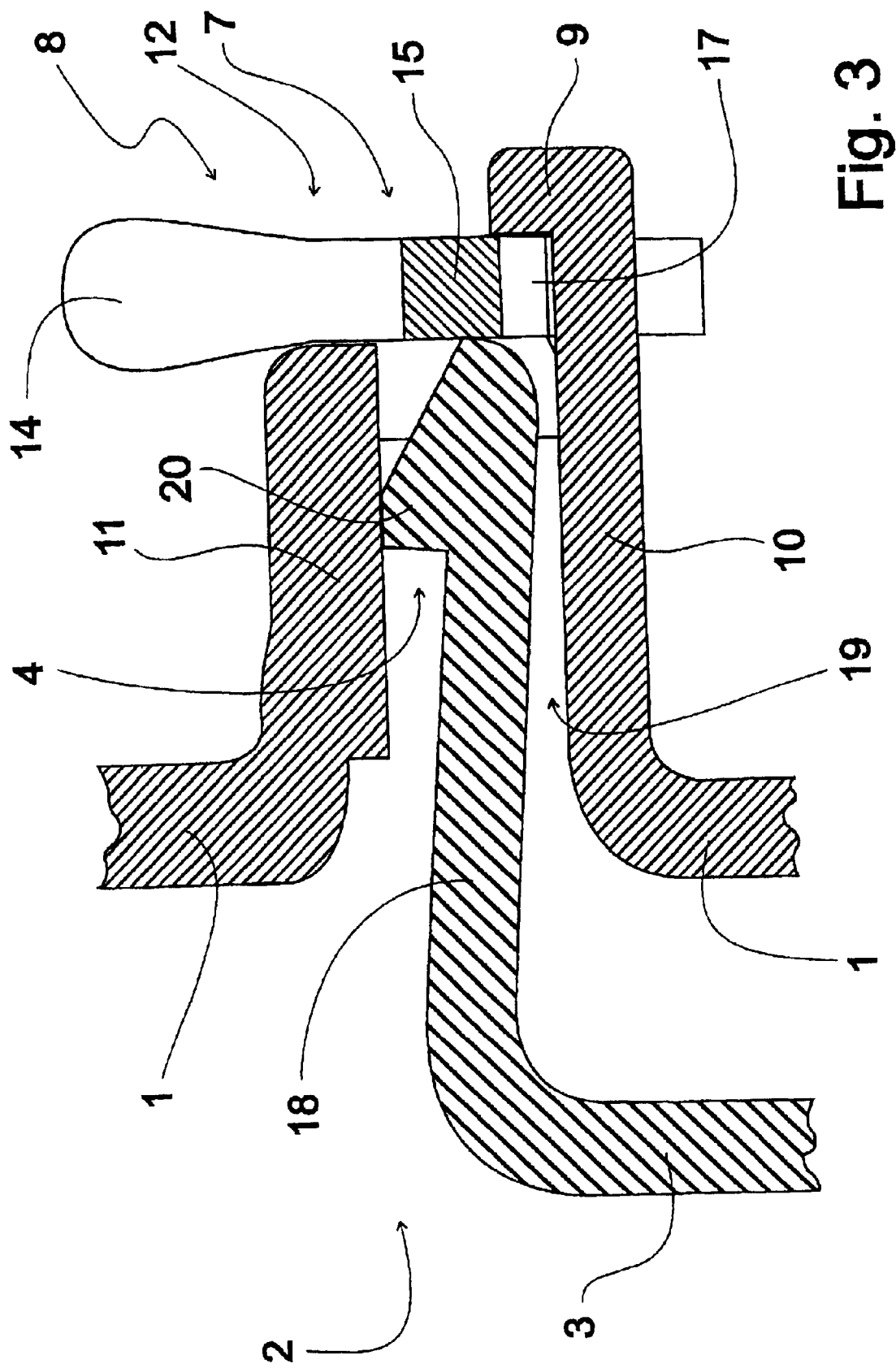
Figure 4:
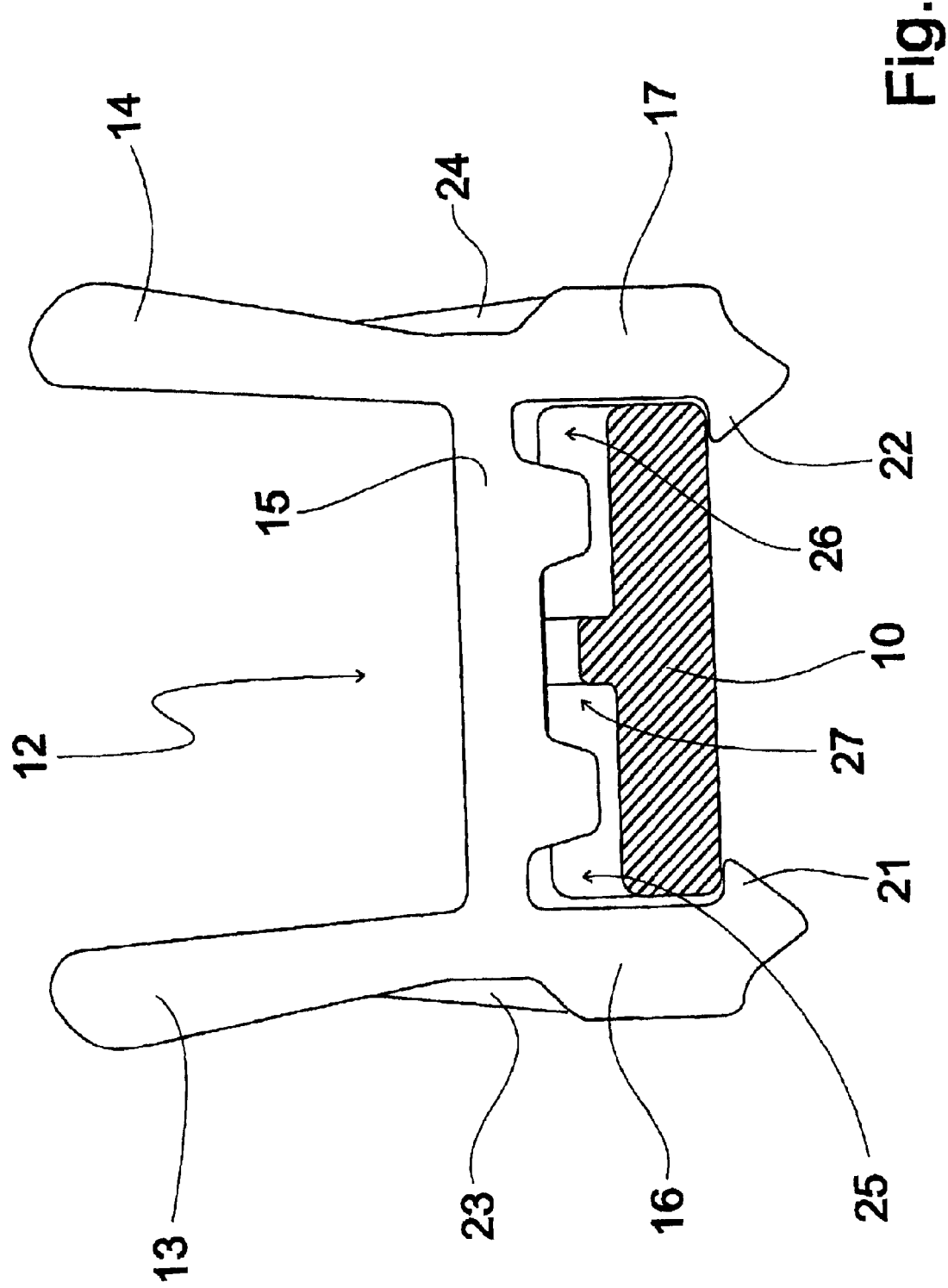
Figure 5:
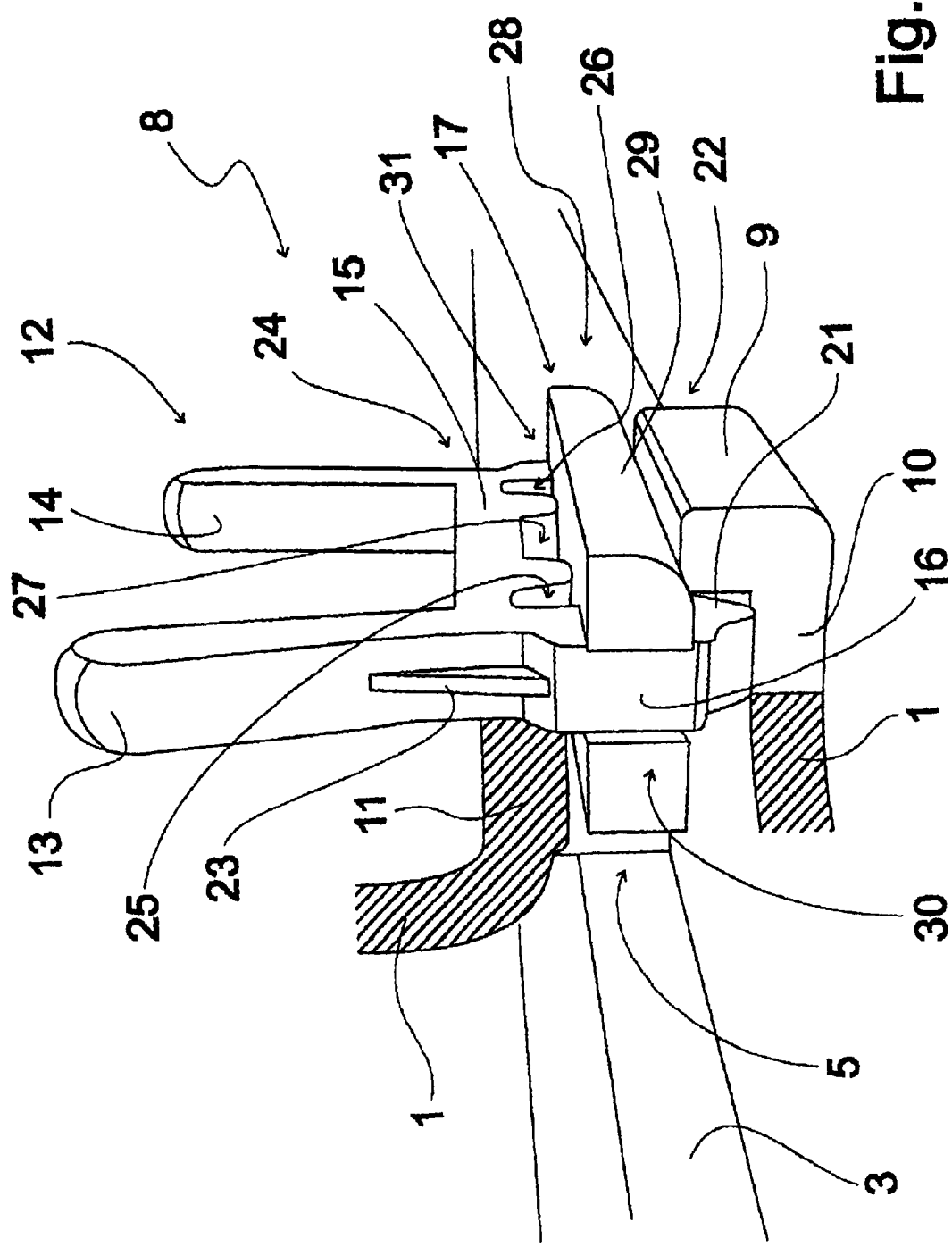
Figure 6:
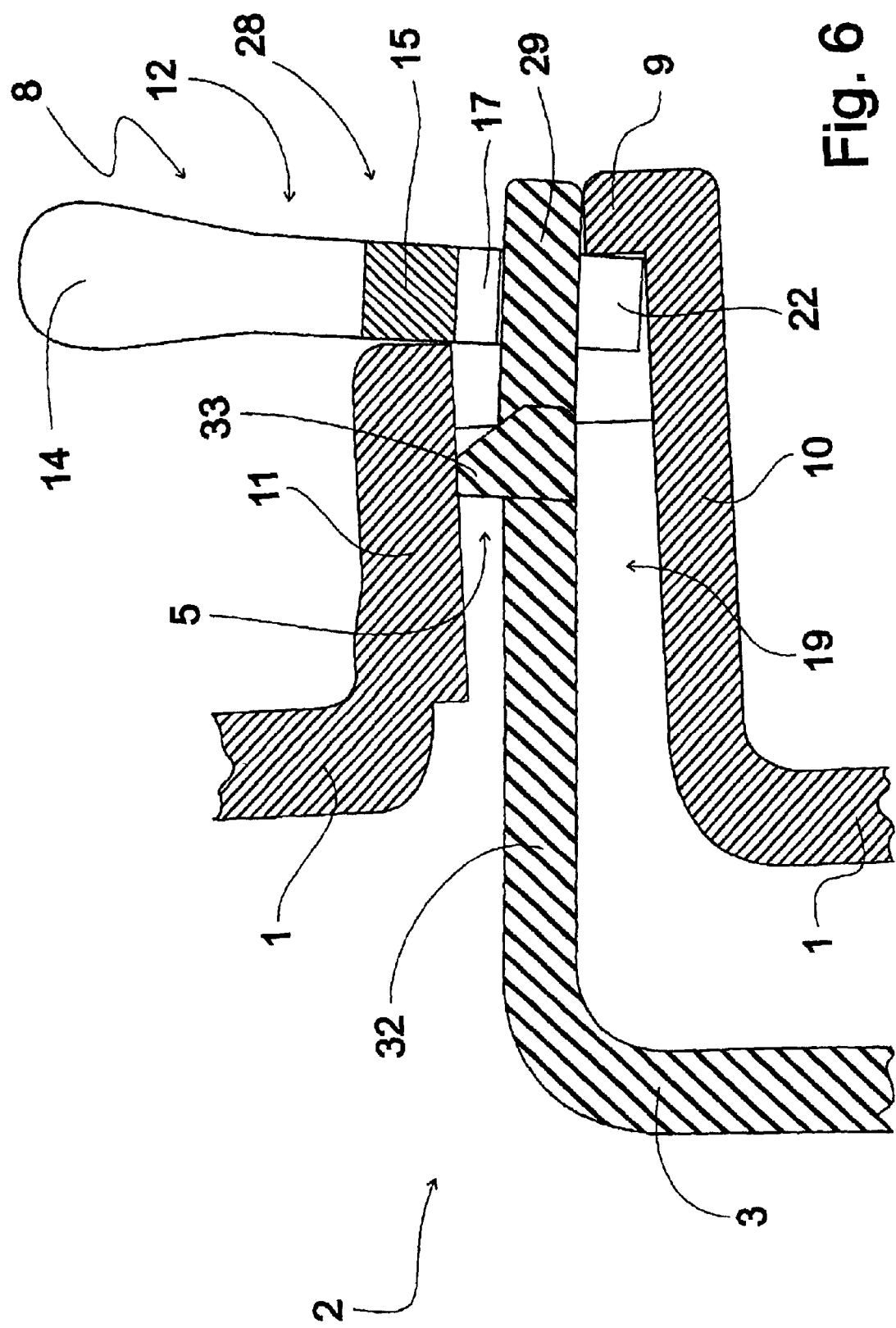
Figure 7:
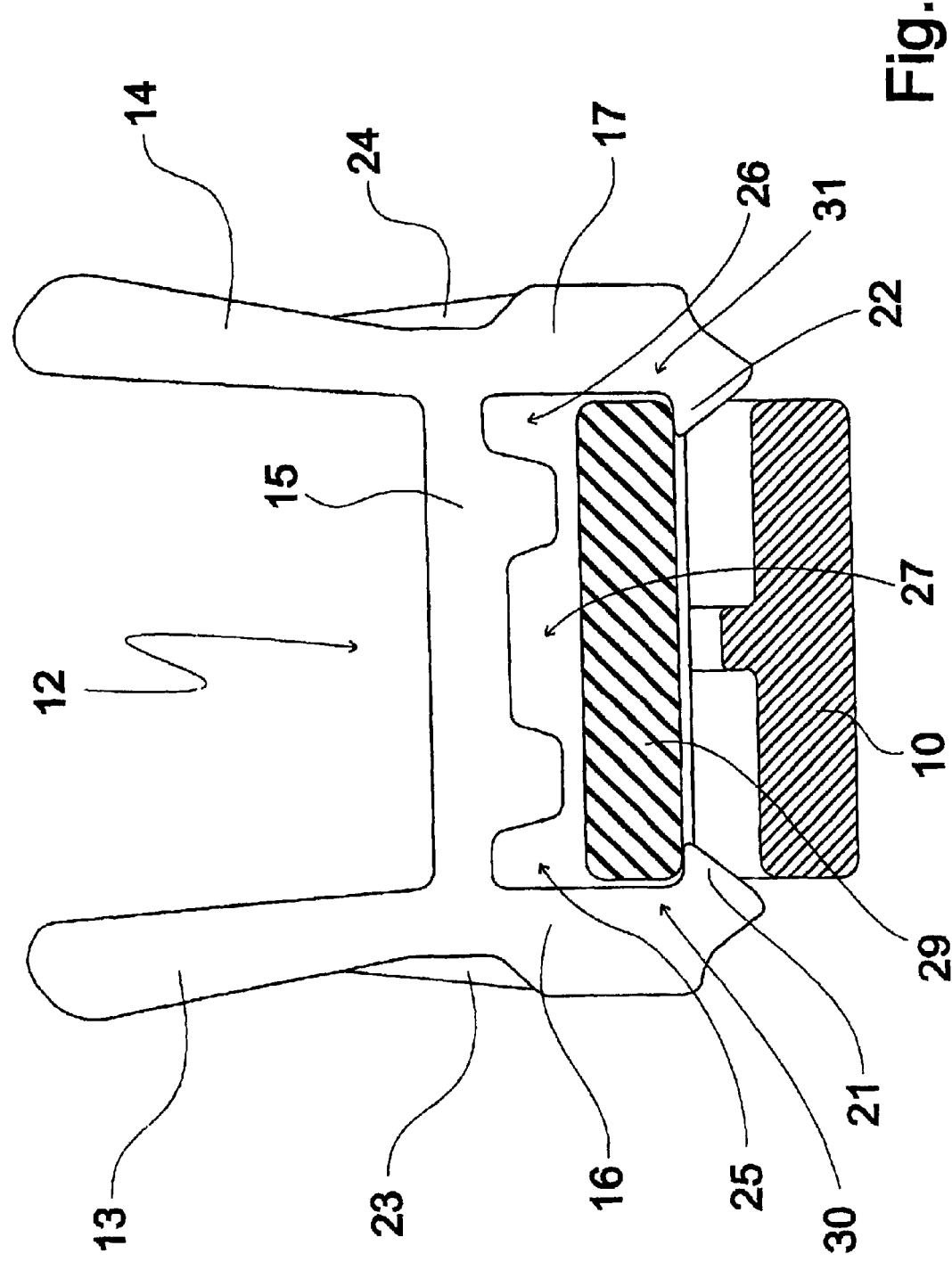
Figure 8:
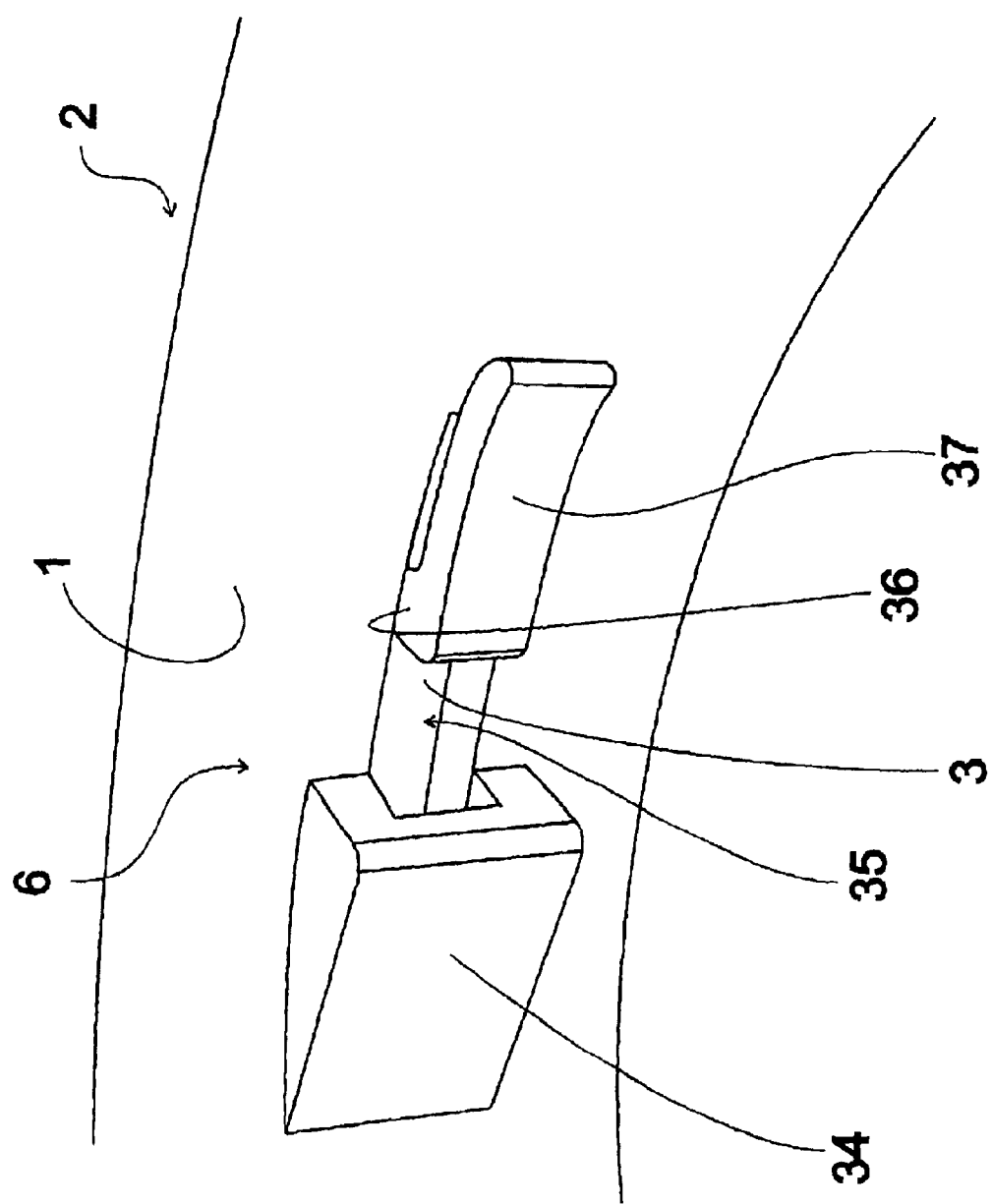
Figure 9:
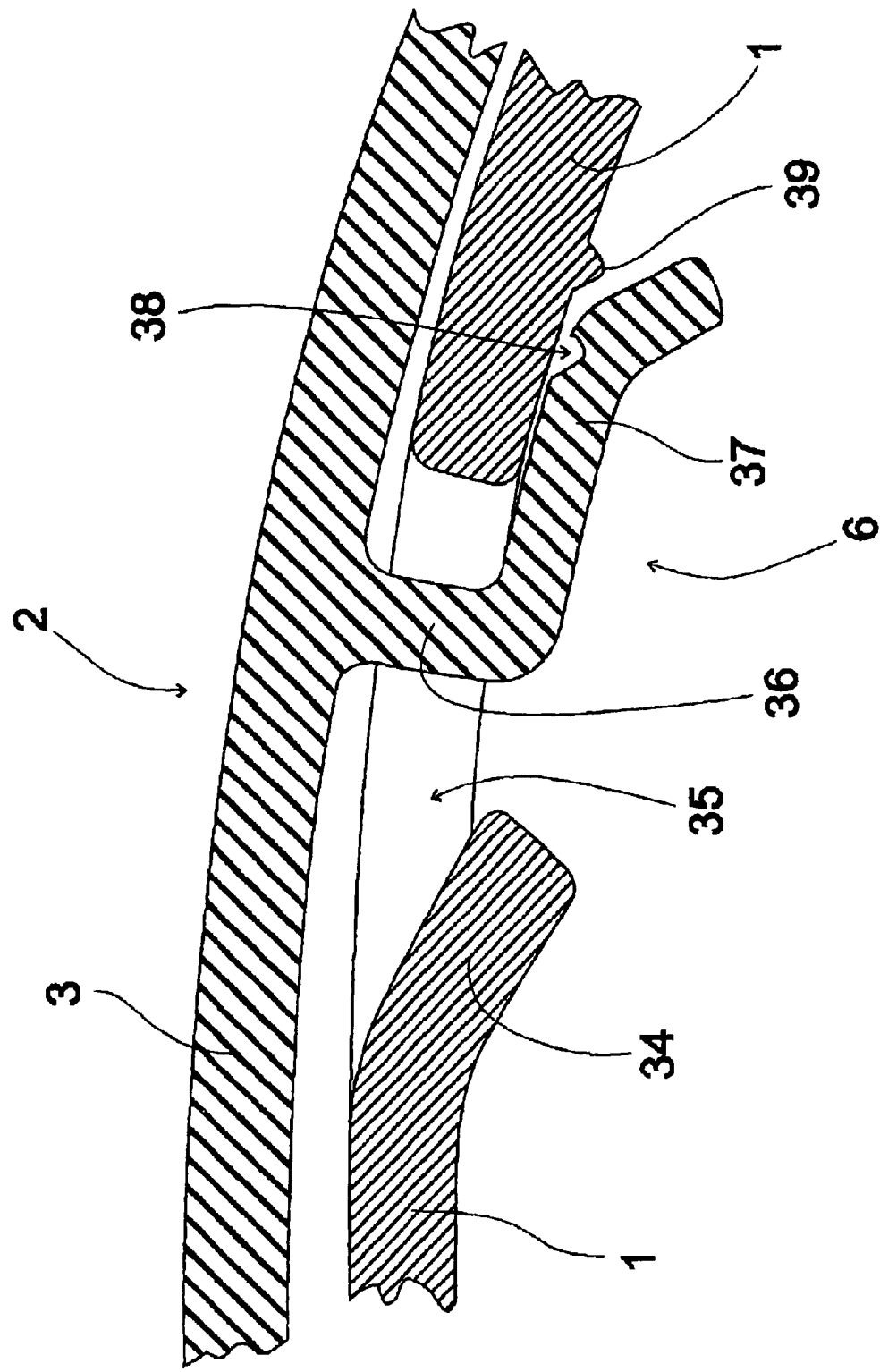
Figure 10:
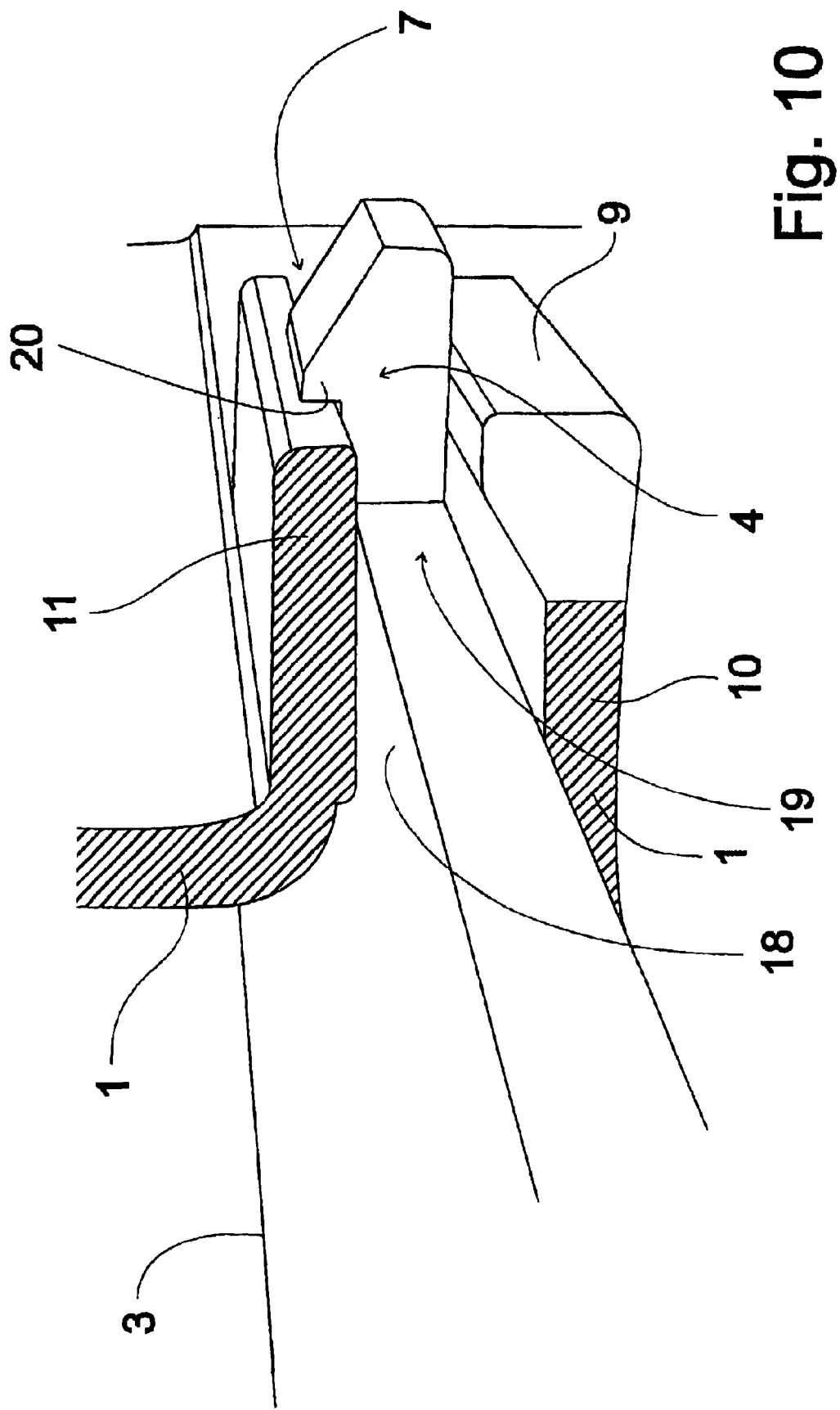
Figure 11:
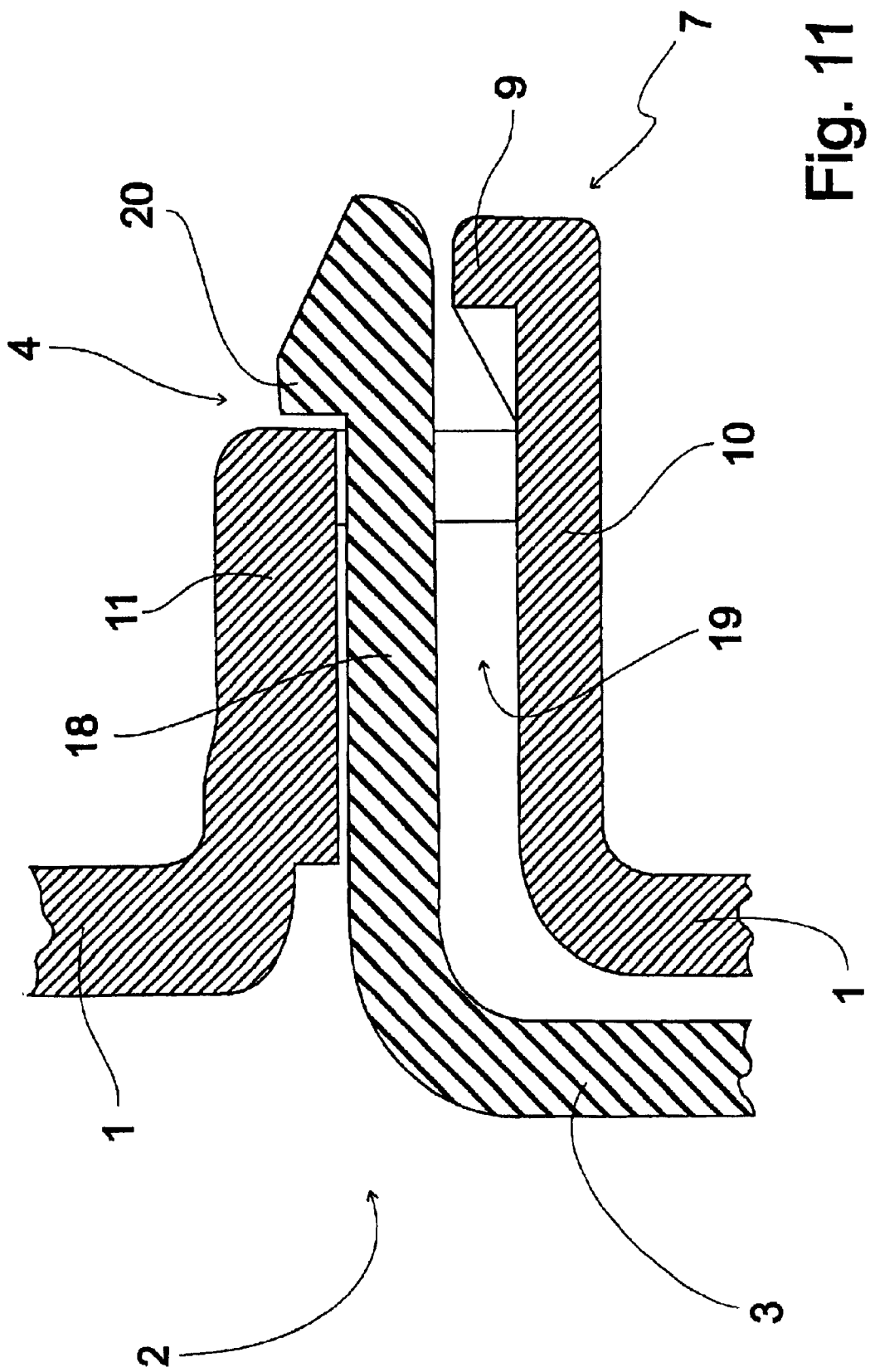
Figure 12:
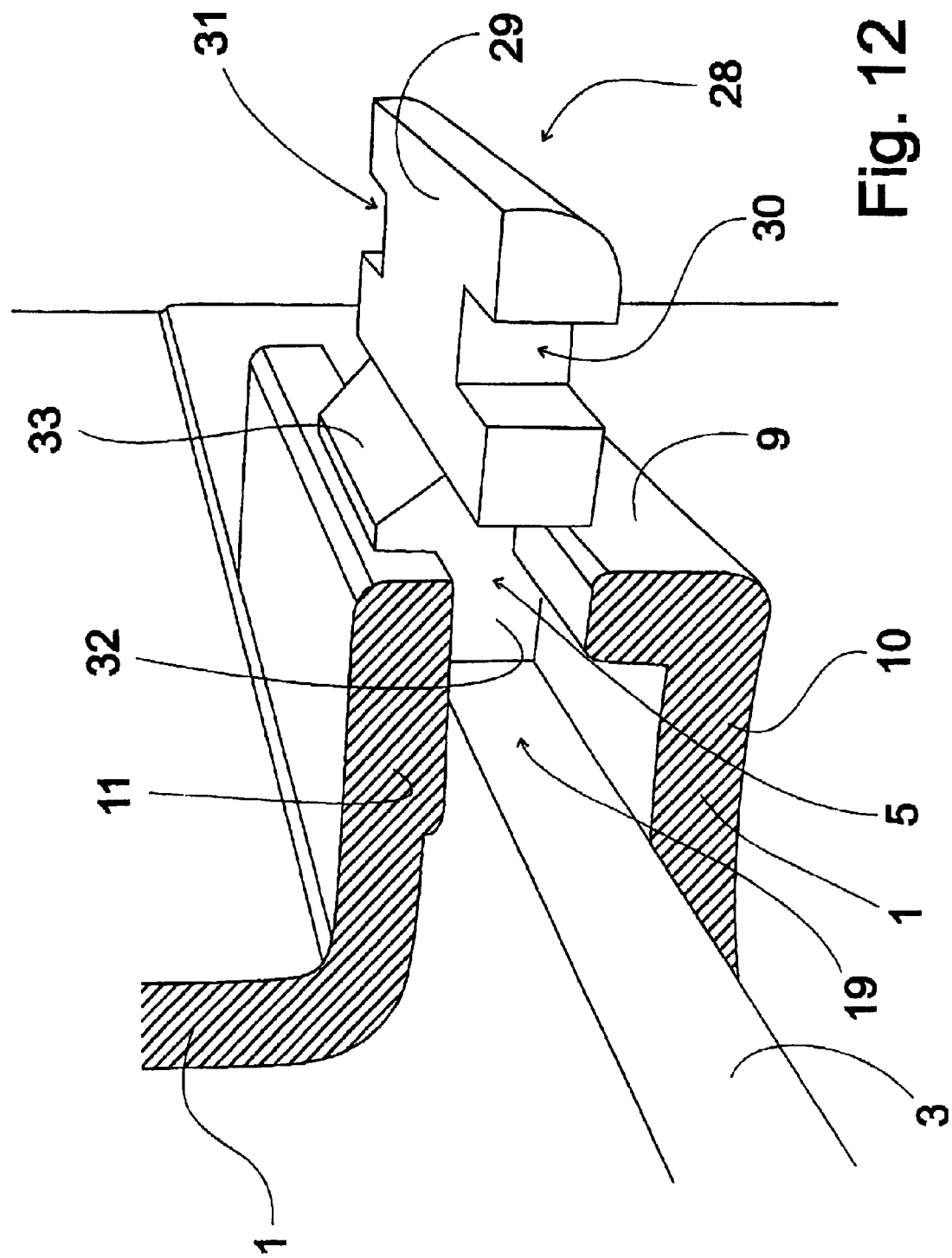
Figure 13:
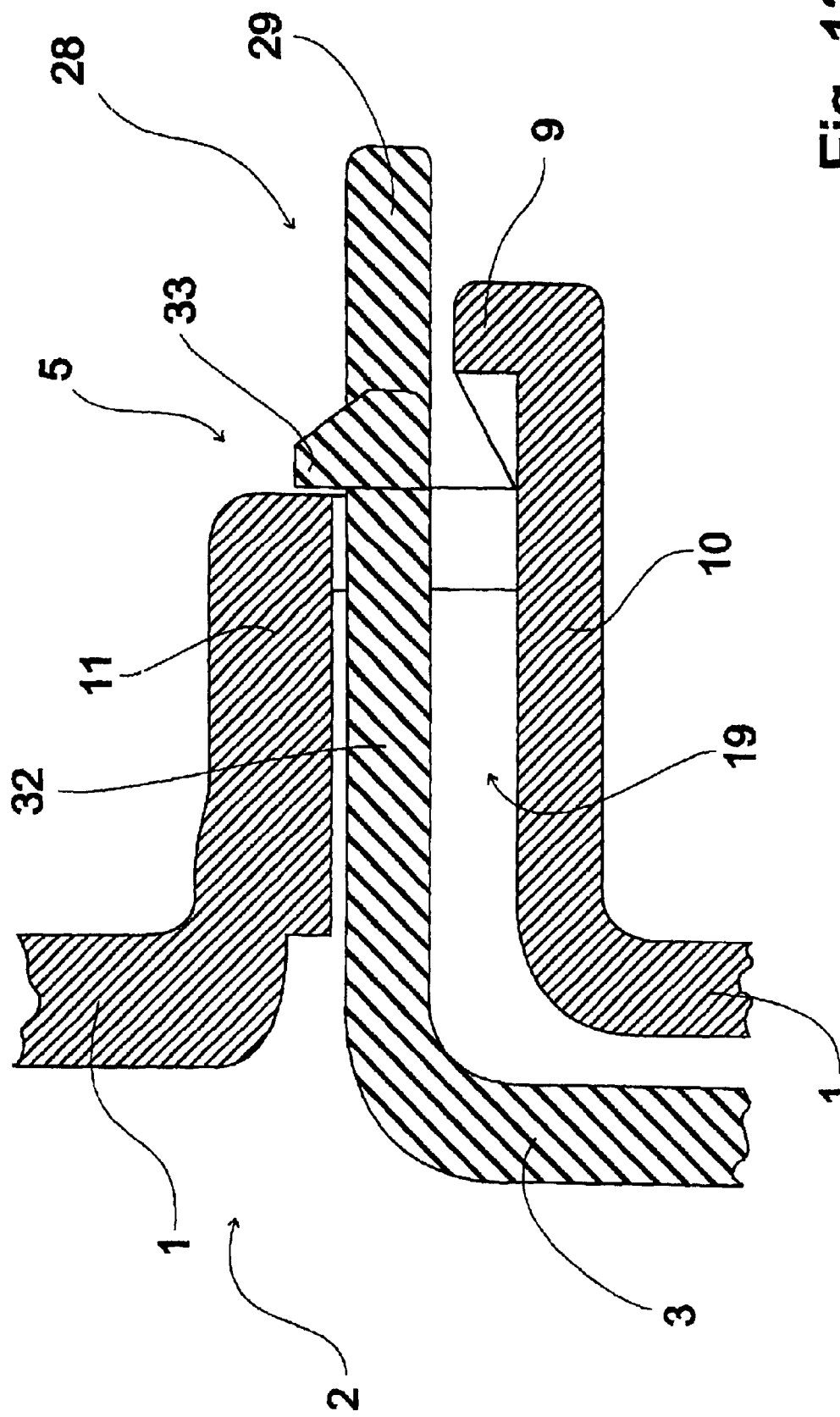
Figure 14:
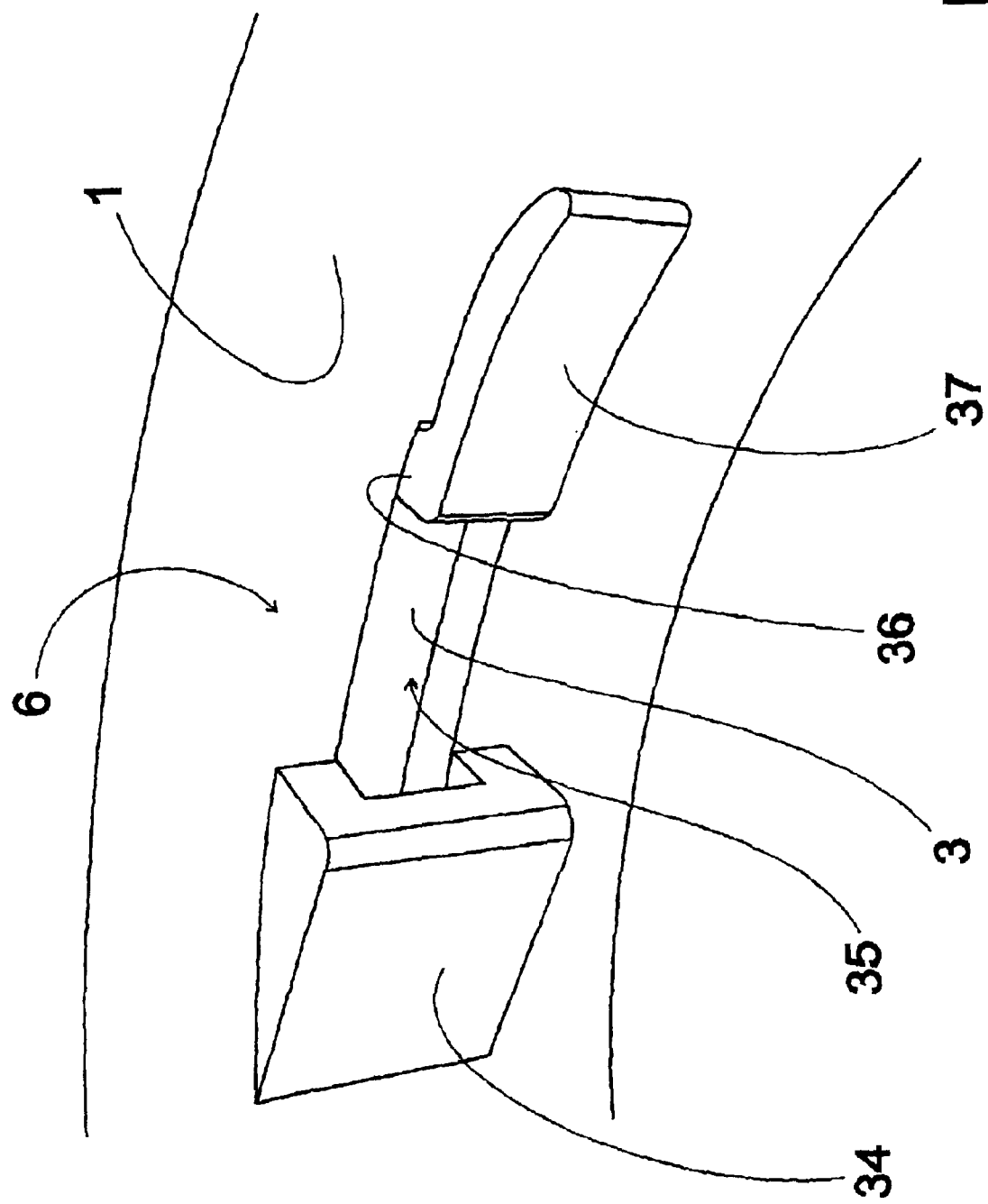
Figure 15:
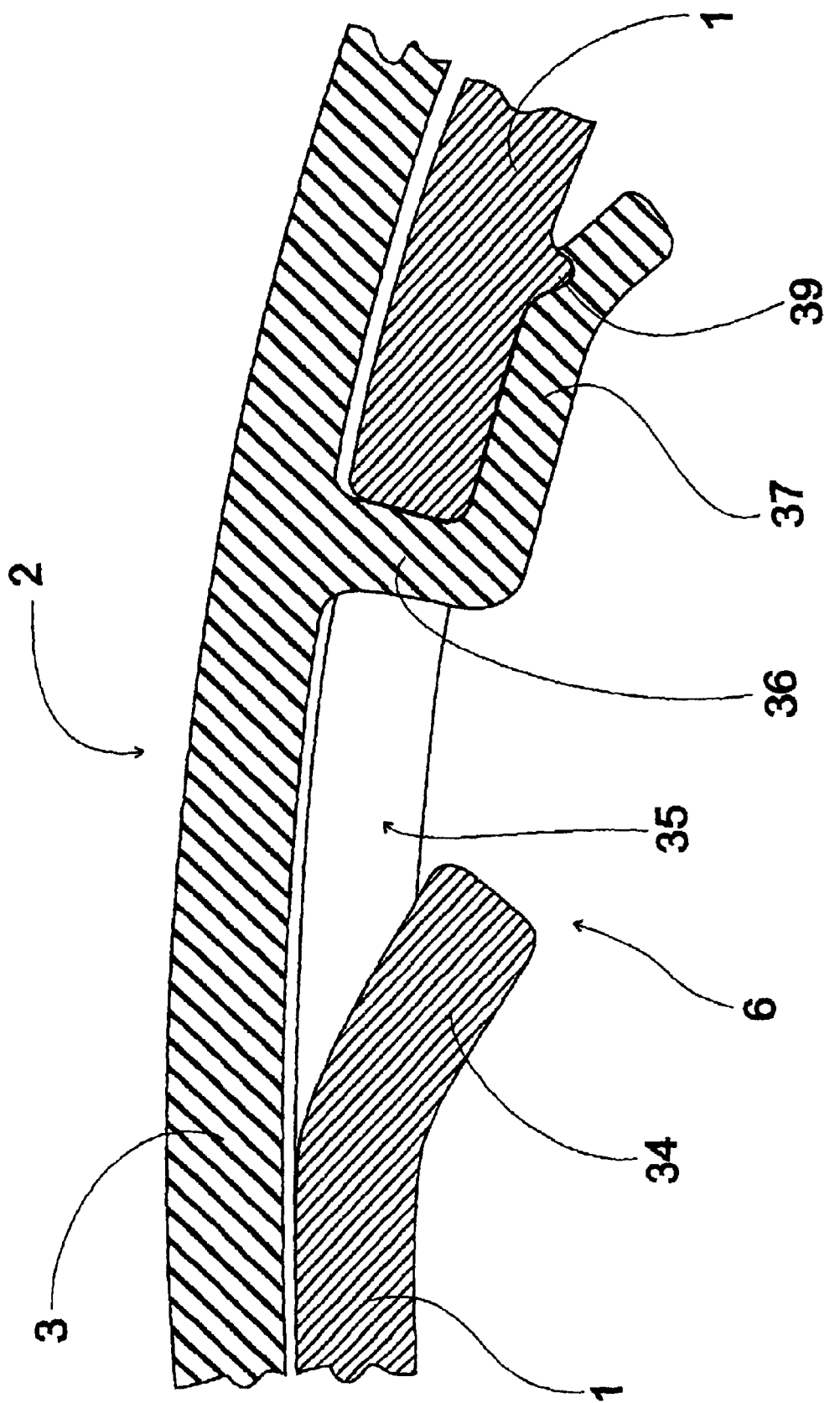

FIG. 2 shows in a perspective, partly sectioned representation, first safety member of the holding means, formed on a first locking connection, FIG. 3 shows in a cross section through the arrangement according to FIG. 2, FIG. 4 shows a partly sectioned front view of the arrangement according to FIG. 2 and FIG. 3, FIG. 5 shows second safety member of stop means formed on a second locking connection, in a perspective, partly sectioned representation, FIG. 6 shows a cross section through the arrangement according to FIG. 5, FIG. 7 shows a partly sectioned front view of the arrangement according to FIG. 5 and FIG. 6, FIG. 8 shows a perspective view of a lateral locking connection formed in the lateral zone of a bumper with arrangement of the bumper and of a bumper protective strip according to FIG. 1, FIG. 9 shows a longitudinal section through the arrangement according to FIG. 8, FIG. 10 shows in a perspective, partly sectioned view, the first locking connection according to FIG. 2, FIG. 3 and FIG. 4, in locked-into-place end position, FIG. 11 shows a cross section through the arrangement according to FIG. 10, FIG. 12 shows in a perspective, partially sectioned view, the second locking connection according to FIG. 5, FIG. 6 and FIG. 7, in locked-into-place end position, FIG. 13 shows a cross section through the arrangement according to FIG. 12, FIG. 14 shows in a perspective view the lateral locking connection according to FIG. 8 and FIG. 9, in locked-into-place end position and FIG. 15 shows a cross section through the arrangement, according to FIG. 14.

DETAILED DESCRIPTION OF THE DRAWING

FIG. 1 shows, in perspective, a bumper 1 with a bumper protective strip 3 having an intermediate spacing of 1 millimeter to 20 millimeters, and preferably between 3 millimeters and 15 millimeters, from a front side 2 of the bumper 1, for use in a painting process. The bumper protective strip 3 is detachably fastened to the bumper by a holding member not shown in FIG. 1. On the bumper 1 and the bumper protective strip 3 there are formed a number of front-side first locking connections 4, of front-side second locking connections 5 as well as of lateral locking connections 6, by means of which the bumper 1 and the bumper protective strip 3 may be connected with a smaller end spacing than the transitional or intermediate spacing utilized by the method and apparatus of the subject invention.

FIG. 2 shows in a perspective, partly sectioned representation with a view toward the rear side of the bumper 1, a first safety means 7 of the holding member 8 constructed on a first locking connection 4. The first safety member 7 have at their disposal a stop lug 9, which is arranged over a tongue 10 on the bumper 1. Between a stop tongue 11 lying opposite the tongue 10 and the stop lug 9 projecting over the stop tongue 11, in the arrangement according to FIG. 2, a H-shaped safety clamp 12 is located on the tongue 10 as a loose or releasable first safety part of the first safety means 7.

The safety clamp 12 has at its disposal a first grip shank 13 as well as a second grip shank 14, which are connected with one another over an connecting cross member or bridge 15. Further, the safety clamp 12 is constructed with a first clamp shank 16 and a second clamp shank 17, which extend as a lengthening of the first grip shank 13 or, respectively, of the second grip shank 14, away from the ends of the bridge 15.

FIG. 3 shows a cross section through the arrangement according to FIG. 2. From FIG. 3 it can be seen that the first locking connection 4 has a first locking element or tongue 18 connected with the bumper protective strip 3, which locking tongue 18 is aligned at about a right angle with the front side of the bumper protective strip 3 and extends, in the representation according to FIG. 3, into a recess 19 bounded in transverse direction of the bumper 1 by the tongue 10 and the stop tongue 11. The end facing away from the front side of the bumper protective strip 3 strikes against the bridge 15 of the safety clamp 12 lying at least sectionwise on the stop lug 9, so that on the introduction of the first locking tongues 18 for the first locking connections 4 into the respective tongue receiving recesses 19; the locking tongues 18 are secured against pushing through the respective tongue receiving recesses 19 even in the case of relatively high forces, and thus the front side of the bumper protective strip 3 remains spaced from the bumper 1.

On the end facing away from the front side of the bumper protective strip 3 of the first locking tongue 18 there is a first locking lug 20 which, according to FIG. 3, faces in the direction of the stop tongue 11, and lies with a flattened end on the stop tongue 11.

FIG. 4 shows a partially sectioned front view of the arrangement according to FIGS. 2 and 3. From FIG. 4 it is evident that the clamp shanks 16, 17 of the safety clamp 12 are formed on their ends facing away from the bridge 15 with a first clamp catch or lug 21 or respectively a second clamp catch or lug 22. The clamp lugs 21, 22 grip the tongue 10, so that the safety clamp 12 will be secured from slipping down from the tongue 10. In the transition zone between the grip shanks 13, 14 and the clamp shanks 16, 17 there are external reinforcing cheeks 23, 24. In the transition zone between the bridge 15 and the clamp shanks 16, 17 there are border recesses 25, 26, and a middle recess 27 in the middle zone of the bridge 15. The reinforcing cheeks 23, 24, the border recesses 25, 26 as well as the middle recess 27, serve to stabilize the safety clamp 12 with minor expansion of the clamp is shanks 16, 17 caused by only minimal external pressure on the grip shanks 13, 14.

FIG. 5 shows in a perspective, partially sectioned representation second safety member 28 of holding member 8 formed on a second locking connection 5. The second safety member 28 have at their disposal, besides the stop lug 9, as well as the safety clamps 12 according to FIG. 2, FIG. 3 and FIG. 4, a safety extension or tongue 29 which extends—with the bumper protective strip 3 spaced from the bumper 1 according to FIG. 2 and FIG. 3, respectively—beyond the stop tongue 11 and on into the area of the stop lug 9. The safety tongue 29 is constructed on its lateral outer edges with a first safety recess 30 and a second safety recess 31, which in each case are dimensioned for the reception of one clamp shank 16, 17.

FIG. 6 shows a cross section through the arrangement according to FIG. 5. The second locking connection has, corresponding to the first locking connection 4, a second locking tongue 32 and a second locking lug 33, which on insertion of the safety clamp 12, lie against the outside of the stop tongue 11 of the bumper 1. Further, in this arrangement the safety clamp 12 strikes with its clamp lugs 21, 22 on the side facing the bumper 1 of the stop lug 9, so that the bumper protective strip 3 is held by the second safety member 28 of the arresting means 8, in the intermediate spacing of the bumper 1 against inadvertent removal and also up to a certain pressure, against further insertion.

FIG. 7 shows a partially sectioned front view of the arrangement according to FIG. 5 and FIG. 6. From FIG. 7 it is evident that the clamp shanks 16, 17 grip with the clamp lugs 21, 22 about the safety tongue 29, so that the safety clamp 12 is secured against removal from the safety recesses 30, 31 of the safety tongue 29.

FIG. 8 shows a perspective view of a lateral locking connection 6 formed in the lateral zone of the bumper 1, with arrangement of the bumper 1 spaced from the bumper protective strip 3 according to FIG. 1. The bumper 1 has in the area of a locking connection 6 or of each lateral locking connection 6, an introduction pocket 34, which is formed in an area on the front side 2 of the bumper 1. Into the bumper 1 there is introduced a finger recess 35 which extends from the introduction pocket 34 in the direction of the nearest end of the bumper 1.

The finger recess 35 is constructed in such manner that a bumper protective strip finger 37 angled form the bumper protective strip 3 and applied over a finger web 36, can be led through. In the arrangement according to FIG. 8, the free end of the bumper protective strip finger 37 extends over the end of the finger recess 35, so that the corresponding lateral end of the bumper protective strip 3 is secured against lifting-off.

FIG. 9 shows a longitudinal section through the arrangement according to FIG. 8. In the representation according to FIG. 9 it is evident that in the bumper protective strip finger 37 on its inside and spaced from the finger web 36, a locking recess 38 is introduced. At a corresponding distance from the end of the finger recess 35 facing away from the introduction pocket 34, the bumper 1 is constructed with a locking projection 39, which is formed essentially complementary to the locking recess 38.

FIG. 10, FIG. 11, FIG. 12, and FIG. 13, respectively, show in each case the bumper protecting strip 3 arranged tightly on the bumper 1 in a locked end position with an end spacing. The locked finished position occurs after the painting operation, or following upon transport with the bumper strip fastened in a spaced relationship to the bumper over, after a removal of the bumper protective strip 3 from the bumper 1, for example, for assembling processes, with subsequent introduction of the locking tongues 18, 32 into the allocated stick-through recesses 19,—the safety clamps 12 of the safety means 7, 28 are removed, and the bumper protective strip 3 is thrust in the direction of the bumper 1 until, as shown in each case in FIG. 10 and FIG. 11, the first locking lug 20, and as shown in FIG. 12 and FIG. 11, the second locking lug 33 grip the stop tongue 11. As a result, in the middle zone of the front side 2, the bumper 1 and the bumper protective strip 3 are secured tightly next to one another and are joined with one another.

FIG. 14 and FIG. 15 show a perspective view and a cross section, respectively, of the lateral locking connection 6 according to FIG. 8 and FIG. 9 in a locked finished position in a mutually tightly adjoining arrangement of the bumper 1 and of the bumper protective strip 3. The locked finished position occurs after the painting or following upon a transport with fastening in the spaced position after the removal of the bumper protective strip 3 from the bumper 1, for example for purposes of mounting, with subsequent introduction of the bumper protective strip fingers 37 into the allocated finger recesses 35—the safety clamps 12 of the safety means 7, 28 are removed, and the bumper protective strip 3 is thrust in the direction of the bumper 1 until the finger web 36 strikes on the end away from the introduction pocket 34 of the finger recess 35 under engagement of the locking projection 39 into the locking recess 38. As a result, in the lateral end zones of the front side 2 the bumper 1 and the bumper protective strip 3 are secured closely together and are joined with one another.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents.

What is claimed is:

1. A bumper for motor vehicles with a connecting assembly for connection with a bumper protective strip, in which the bumper protective strip is secured on the bumper, wherein the bumper has a holding member with which the bumper protective strip is detachably fastened in a spaced manner from the bumper.

2. The bumper of claim 1, wherein the holding member has a safety member connected to the bumper, in which the safety member has safety parts detachably connected with the bumper or the bumper protective strip.

3. A bumper protective strip for motor vehicles with a connecting element for connection with a bumper, in which the bumper protective strip is secured to the bumper wherein the bumper protective strip has a holding member with which the bumper protective strip is secured to the bumper in a spaced manner, and is fastenably detachable therefrom.

4. The bumper protective strip of to claim 3, wherein the holding member has a safety member connected with the bumper protective strip, in which the safety member have safety parts detachably connectable with the bumper protective strip or the bumper.

5. A combination of a bumper and a bumper protective strip, in which the bumper and the bumper protective strip are connectable with one another with connecting elements so that the bumper protective strip is spaced a certain distance from the bumper, wherein the bumper and the bumper protective strip have a holding member, so that the bumper protective strip is detachably fastenable in a spaced manner to the bumper to create a space between said bumper and the bumper protective strip.

6. The combination of claim 5, wherein the holding member has a first safety member connected with the bumper and the first safety member has first safety parts detachably connectable with the bumper or the bumper protective strip.

7. The combination of claim 6, wherein the holding member has a second safety member connected with the bumper protective strip, wherein the second safety member has second safety parts detachably connectable with the bumper protective strip or the bumper.

8. The combination of claim 7, wherein the first safety parts and the second safety parts are identical.

9. The combination of claim 7, wherein the bumper has a number of insertion recesses, into which allocated locking tongues with end-side locking lugs, constructed on the bumper protective strip may be inserted.

10. The combination of claim 9, wherein the first safety member have cover tongues formed on the side away from the bumper protective strip.

11. The combination of claim 10, wherein the first safety parts are connectable with the tongues in such manner that the insertion recesses are secured against the breaking through of the locking lugs.

12. The combination of claim 11, wherein the second safety members have safety tongues at an outer end thereof.

13. The combination of claim 12, wherein the second safety parts are connectable with the safety tongues on insertion through said insertion recesses.

14. The combination of claim 13, wherein the safety parts are connectable with the tongues and with the safety tongues.

15. The combination of claim 6, wherein the safety parts have two gripping shanks and a bridge connecting said shanks.

16. The combination of claim 15, wherein the safety clamps, the tongues and the safety tongues grip one of the clamp lugs, the tongues and the safety tongues.

17. The combination of claim 16, wherein safety recesses are formed on the safety tongues into which the clamping shanks are introducible.

18. The combination of claim 16, wherein the bridge blocks the movement of the locking tongues through the recesses.

19. The combination of claim 18, wherein the tongues have a stop lug on their distal ends.

* * * * *